(12) United States Patent
Li et al.

(10) Patent No.: US 12,189,699 B2
(45) Date of Patent: Jan. 7, 2025

(54) METHOD AND SYSTEM FOR PROVIDING CONTENTS WITHIN REGION OF INTEREST OF A USER

(71) Applicant: Framy Inc., Grand Cayman (KY)

(72) Inventors: Yu-Hsien Li, Taipei (TW); Hao-Wen Mei, Taipei (TW); Ya-Ching Chang, Taipei (TW)

(73) Assignee: Framy Inc., Grand Cayman (KY)

( * ) Notice: Subject to any disclaimer, the term of this patent is extended or adjusted under 35 U.S.C. 154(b) by 81 days.

(21) Appl. No.: 18/075,373

(22) Filed: Dec. 5, 2022

(65) Prior Publication Data
US 2023/0244729 A1   Aug. 3, 2023

(30) Foreign Application Priority Data
Jan. 28, 2022 (TW) .................................. 111103996

(51) Int. Cl.
| | |
|---|---|
| *G06F 16/9535* | (2019.01) |
| *G06F 3/04817* | (2022.01) |
| *G06F 16/29* | (2019.01) |
| *G06F 16/9537* | (2019.01) |
| *G06Q 50/00* | (2024.01) |
| *G06Q 50/10* | (2012.01) |
| *G06Q 50/50* | (2024.01) |

(Continued)

(52) U.S. Cl.
CPC ...... *G06F 16/9535* (2019.01); *G06F 3/04817* (2013.01); *G06Q 50/01* (2013.01)

(58) Field of Classification Search
CPC .. G06F 16/9535; G06F 16/29; G06F 16/9537; G06F 3/04817; G06Q 50/10; G06Q 50/50; G06Q 50/01; H04N 1/00442; H04W 4/02
See application file for complete search history.

(56) References Cited

U.S. PATENT DOCUMENTS

| | | | | |
|---|---|---|---|---|
| 9,194,716 | B1 * | 11/2015 | Cutter | ................ G01C 21/3679 |
| 2011/0313657 | A1 * | 12/2011 | Myllymaki | ............. H04W 4/18 |
| | | | | 701/438 |

(Continued)

FOREIGN PATENT DOCUMENTS

| | | |
|---|---|---|
| EP | 3941023 A1 | 1/2022 |
| TW | I356318 B | 1/2012 |

(Continued)

*Primary Examiner* — Robert W Beausoliel, Jr.
*Assistant Examiner* — Mohammad S Bhuyan
(74) *Attorney, Agent, or Firm* — Li & Cai Intellectual Property Office

(57) ABSTRACT

A method and a system for providing contents within a region of interest of a user are provided. The system includes a serving system having a database, and an application program executed in a user device. The application program is configured to initiate a user interface for allowing the user to browse the one or more contents within the region of interest. The serving system receives an instruction that is generated when the user clicks a link to enter the region of interest via the user interface. The database is queried according to one or more regions of interest of the user in a user regional activity profile, so as to obtain the contents within every region of interest. Lastly, the serving system provides links associated with the one or more contents to the user device, and the links can be displayed on the user interface.

15 Claims, 9 Drawing Sheets

(51) Int. Cl.
*H04N 1/00* (2006.01)
*H04W 4/02* (2018.01)

(56) References Cited

U.S. PATENT DOCUMENTS

| | | | | |
|---|---|---|---|---|
| 2013/0073400 | A1* | 3/2013 | Heath | .................... G06Q 50/01 |
| | | | | 715/738 |
| 2016/0275102 | A1* | 9/2016 | Haro | ........................ G06F 16/29 |
| 2022/0019635 | A1 | 1/2022 | Li et al. | |

FOREIGN PATENT DOCUMENTS

| TW | I522820 B | 2/2016 |
|---|---|---|
| TW | I545301 B | 8/2016 |
| TW | 201741627 A | 12/2017 |
| TW | 201741628 A | 12/2017 |

\* cited by examiner

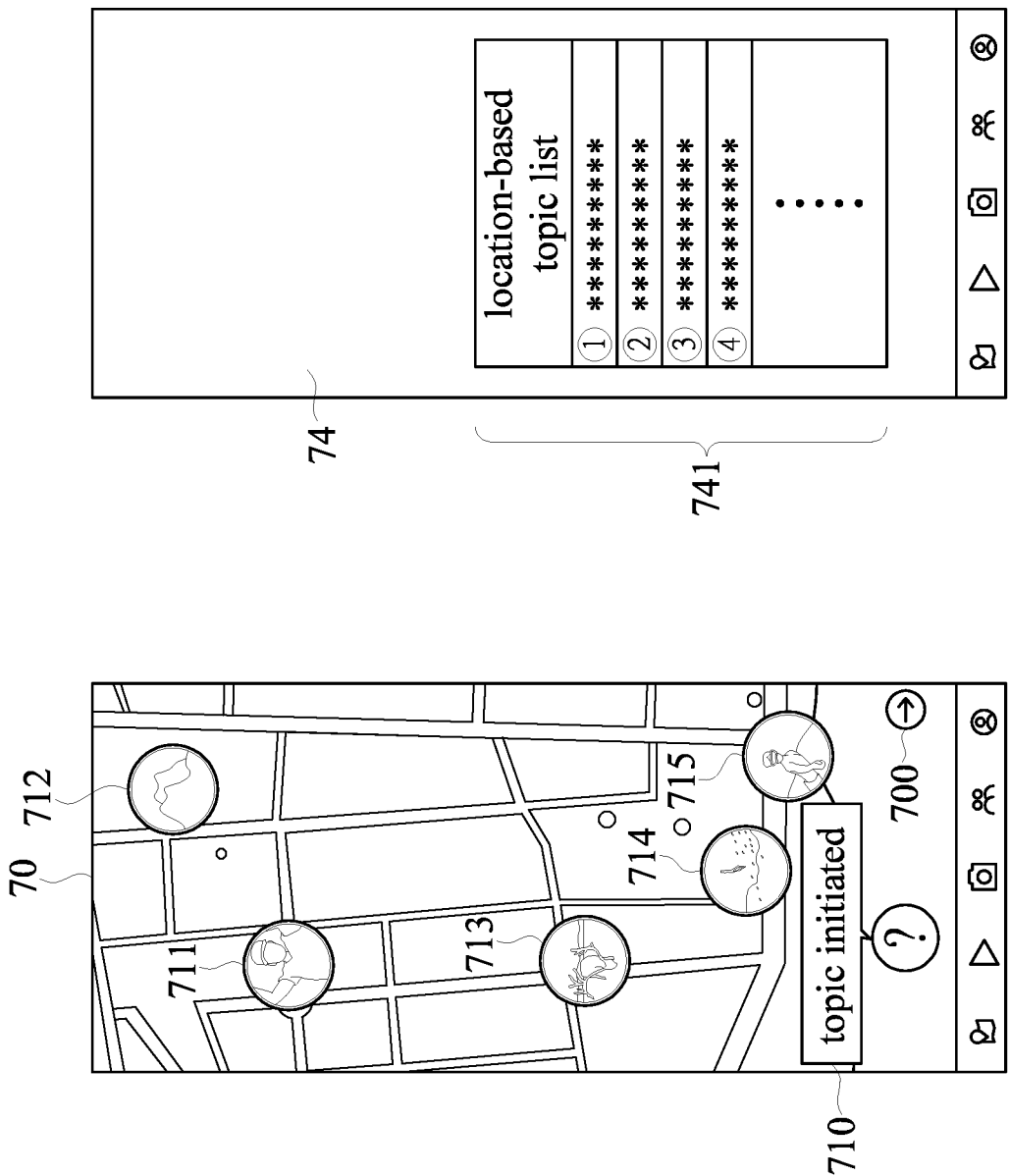

METHOD AND SYSTEM FOR PROVIDING CONTENTS WITHIN REGION OF INTEREST OF A USER

CROSS-REFERENCE TO RELATED PATENT APPLICATION

This application claims the benefit of priority to Taiwan Patent Application No. 111103996, filed on Jan. 28, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method for providing location-based contents, and more particularly to a method and a system for providing ROI-based contents to a user through learning of user preferences and regions of interest.

BACKGROUND OF THE DISCLOSURE

In current social media, a proprietary application program executed in a personal device of a user can learn from activity data of the user generated in the social media. Thus, a user preference can be determined, and a user profile that is used to describe the user preference is established. An algorithm operated in the social media is capable of providing contents to the user based on the user preference. One objective of learning the user preference is to enhance the user's stickiness to the social media. Another objective is to provide commercial information in compliance with the user preference.

User activities learned by the social media can be, for example, a collection of the user (e.g., a specific content that is viewed and saved by the user), a reply to the content, a thumbs-up for the content, a subscription to a channel of a content creator, or sharing of the content with other contacts. When a certain amount of the user activities is accumulated, a system of the social media can learn the user preference based on properties of the contents, so as to establish or update the user profile.

For example, current social media can generally learn the location associated with the contents that the user is interested in, so as to determine a region of interest of the user. Accordingly, the social media can recommend to the user contents that are associated with their region of interest. Such contents can be referred to as location-based contents (e.g., introductions to regional cuisine, travelling, cultural videos and pictures).

When the algorithm operated in the social media learns the user preference, the contents within a specific range of preference are likely to be given too much focus. The contents to be provided may be similar and lack diversity since the algorithm does not take other contents that the user may favor into account. Taking a region associated with the user as an example (which may be a geographic area), the user may be interested in more than one or two regions. That is, the user is interested in not only the geographically-related regions, but also countries and cities that are not geographically related to them. However, the algorithm operated in the current social media can only deduce the contents that the user is interested in or the contents associated with the region where the user is located. As such, the contents provided by the conventional social media may be much alike since the contents are configured to be associated with a specific country or area. Moreover, the problems mentioned below can also reduce the user's stickiness to the social media. For example, when the social media provides contents associated with multi-layer regions, these contents can fail to meet the interest of the user. When a swiping gesture is used to move an electronic map for browsing contents of a specific region, the user is required to perform the swiping gesture, a zooming-in gesture, and a zooming-out gesture multiple times before being able to browse the region of interest. Or, when the user is guided to different regions through the electronic map, the social media may not able to provide the contents of the region that is of interest to the user due to the region being overly broad. The above-mentioned issues can reduce user stickiness to the social media.

SUMMARY OF THE DISCLOSURE

In order to overcome the problem of an algorithm used to establish a user preference in the current social media being not able to learn a region of interest of a user and provide relevant contents, the present disclosure provides a method and a system for providing contents within a region of interest of a user. An algorithm provided in the method and the system is able to obtain the region of interest of the user according to interests of the user and allows addition of the contents within the region of interest. When the user clicks on a link in an application program provided by the system, the user can view links associated with the contents that match the interests of the user.

According to one embodiment of the system for providing the contents within the region of interest of the user, the system includes a serving system having a database and the application program executed in a user device. The database records multiple location-based contents and multiple user data. The application program is used to provide social media services. After a user interface is initiated, the user can browse the one or more contents within the region of interest via the user interface.

The serving system operates the method for providing the contents within the region of interest of the user. In the method, a link of the region of interest of the user is provided on the user interface. The serving system receives an instruction that is generated when the user clicks on the link of the region of interest of the user. In the serving system, the database is queried according to one or more regions of interest recorded in a user regional activity profile, so as to obtain the one or more contents configured to be within the region of interest. Afterwards, the serving system provides one or more links associated with one or more corresponding contents, and displays the one or more links on the user interface.

Preferably, the application program initiates the user interface using an electronic map as a background. The one or more links can be one or more linking icons displayed on the electronic map, and each of the linking icons can be an icon of an author who creates the linked content or a content thumbnail.

Preferably, the serving system acquires the user regional activity profile and a user preference profile according to a user identification that is generated when the user manipulates the application program. The serving system obtains the one or more contents that correlate to one of the regions of interest of the user and match the user preference.

Further, formation of the user regional activity profile includes the following steps. A global map configured to have N layers of regions is firstly provided, in which "N" is a positive integer. The global map is divided into multiple first-layer regions, and each of the first-layer regions is divided into multiple second-layer regions. Accordingly, the global map is divided into multi-layer regions until reaching an N-layer region that is set by the system. Afterwards, when the serving system receives location information of a location generated as the user manipulates the user device and performs a valid activity at this location, the location information, the N-layer region of the location and the multiple layers associated with the first-layer region are recorded in the serving system. A score is then assigned to the multi-layer regions associated with the location. After the scores associated to multi-layer regions that are associated with multiple locations of the user are accumulated, the user regional activity profile is formed and used to obtain one or more regions of interest of the user.

Further, the valid activity indicates a behavior of a user participating in score calculation in a social media. The behavior includes clicking on and viewing a location-based content, tagging a like to the location-based content, sharing the location-based content, actively searching for the location through the application program, and clicking on one of the links at the location when viewing the location-based content.

Further, the scores of multi-layer regions that respectively associate with multiple locations of the user within a valid time are accumulated, and the scores accumulated in the regions of different layers are sorted for the system to provide the location-based contents that match the user preference in an order compliant with regions of interest of the user.

Preferably, the user preference profile can be formed by the steps of: collecting the user's activity data through the application program executed in the user device; analyzing the user's activity records, in which a machine-learning algorithm is used to learn location-based data features from the activity data and correlations among the data features; and obtaining a location-based personalized model that is used to describe the user preference or forming location-based data that is a combination of features of the user preference, so as to form the user preference profile.

Further, when the serving system cannot retrieve any more regions of interest of the user, the serving system can still provide location-based contents that are new, popular and/or unviewed.

Still further, the one or more contents within the region of interest provided by the serving system include a discussion topic that is a location-based topic to be initiated at a location for interacting with other users.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which:

FIG. 7A to FIG. 7D are schematic diagrams showing use of a graphical user interface to initiate a location-based discussion topic according to one embodiment of the present disclosure.

DETAILED DESCRIPTION OF THE EXEMPLARY EMBODIMENTS

Figure 1:
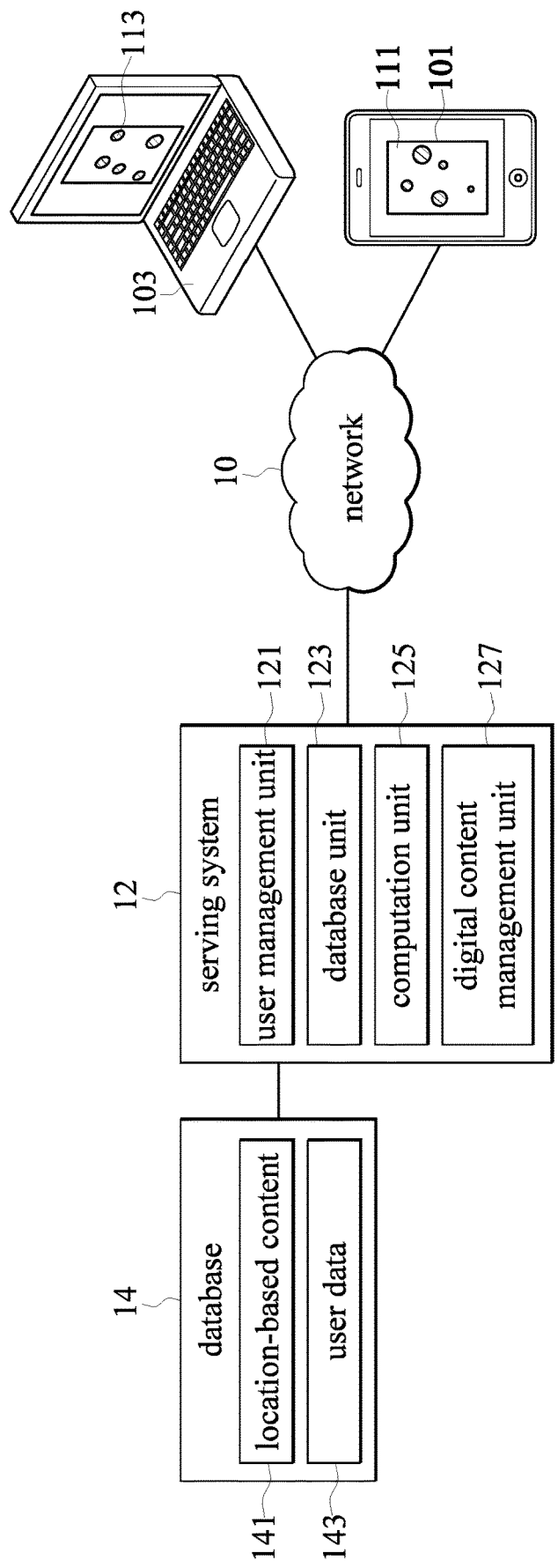
FIG. 1 is a schematic diagram showing a framework of a system that performs a method for providing contents within a region of interest of a user according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The present disclosure relates to a method for providing contents within a region of interest of a user and a system that implements the method. Reference is made to FIG. 1, which is a schematic diagram showing a framework of the system. The system includes a serving system 12 that provides a cloud content service. The cloud content service provides the contents within the region of interest of the user according to location information that is generated when the user manipulates various user devices 101 and 103. In one of the embodiments of the present disclosure, the service provided by the serving system 12 can be operated in a social media. The users in the social media can share various location-based digital contents, such as videos, pictures, audios and texts.

Referring to FIG. 1, the serving system 12 includes a database 14 that records multiple location-based contents 141 and multiple pieces of user data 143. The location-based contents 141 are, for example, the various digital contents that are provided to the user for matching a user preference and the location information. In addition, the contents are uploaded and shared by many users. The database 14 also records an author of each of the contents, a number of times the content is played, a user who likes (e.g., gives a thumbs-up to) the content, a user who saves the content, a number of shares, and the time of creation of the content. Such information serves as references for calculating an evaluation score indicative of popularity of each of the contents. The user data 143 in the database 14 is about the users who are registered in the serving system 12 for receiving the service. The users can be members of the social media. The user data 143 includes various data of the user, such as identification and a user profile. In the method for providing the contents within the region of interest of the user, the user profile can be classified into a learned user preference profile and a user regional activity profile that is obtained according to a score of the region of interest of the user based on a multi-layer regional structure.

The serving system 12 provides the service to the various user devices 101 and 103 via a network 10. The user devices 101 and 103 can obtain many links that are associated with various contents via the network 10. A software procedure that is configured to dynamically display digital contents is executed in the user devices 101 and 103, so that the links can be received, playback files can be retrieved on demand, and the digital contents can be browsed and played. The links can be graphical links shown on a specific scenario image or on an electronic map (e.g., graphical user interfaces 111 and 113 shown in the diagram). The serving system 12 that provides the service and a software program executed in the user device 101 or 103 can form the system that performs the method for providing the contents within the region of interest of the user.

The user device 101 or 103 can be, for example, a mobile device of the user. Particularly, said mobile device can be equipped with a touch screen that allows the user to operate by finger gestures. The user can use gestures to decide a display area to be browsed and select a point of interest on a browsing page via the application program executed in the user device 101 or 103. After selecting the point of interest, a playback page is initiated by the application program to play the digital contents associated with the selected point of interest. In particular, when the user browses the contents of a certain region, the browsing page is initiated to provide a region-linking button that allows the user to switch to a specific region of interest in accordance with the user preference. It should be noted that the serving system 12 relies on the user activity data to determine one or more regions of interest of the user and provide one of the regions of interest. In a certain circumstance, no link within the region of interest can be provided to the user. However, under most circumstances, one or more links of the contents within the regions of interest of the user can be shown on the browsing page. The links of the contents shown on the browsing page can be shown as content-linking icons or a list.

Multiple functional elements are implemented by software or in cooperation with hardware in the serving system 12. One of the functional elements in the serving system 12 is a user management unit 121. The user management unit 121 is used to manage the users who use the service provided by the serving system 12. By the user management unit 121, the user is permitted to browse and play the digital contents through identity authentication. The user management unit 121 also stores records of use of digital contents in the serving system 12 by the users, the digital contents that the users create, and activity records of the users in the social media.

The serving system 12 includes a database unit 123 that is used to manage the database 14. Each content file in the database unit 123 is associated with a database address that can be an address of a physical file recorded in the database 14 for linking the contents displayed on the display area. The database unit 123 allows the software procedure in the user device to query the database based on the display area. Preferably, by querying the database 14 of the serving system 12, a plurality of contents associated with the display area, a linking address of each of the contents, coordinates of each of the contents within the display area, and a score of related activity when the user accesses the content can be obtained.

The serving system 12 includes a computation unit 125 (e.g., a computation circuit of the serving system 12). The serving system 12 can use the computation circuit to process data, such as a coordinate range of the display area, a linking address of the digital content, the digital content and a location associated with the point of interest, the display content to be refreshed, and a score of the digital content provided by the user device.

A digital content management unit 127 is used to process the uploaded and downloaded contents. Each content file can be stored in the database 14. A database address corresponding to the content and the coordinates of the point of interest are rendered and stored in the database 14 along with data of the author of the digital content.

The graphical user interface 111 or 113 can show an electronic map. The linking icons of the contents are displayed at some locations in the display area according to their corresponding geographic coordinates. The linking icons of the contents can be used as representative images of the point of interest that gathers a plurality of contents. The linking icon can be a thumbnail of the content or a picture/head image of the user who creates the content.

The score of the content can be obtained according to various scoring factors. The scoring factors are provided by the serving system 12, and the content is scored by the serving system 12 based on a number of creations from the author of the content, a number of followers of the content, a number of times the content is played, a rating, a creation time, a personal interest of the user viewing the content, or any combination thereof. In actual implementation, scoring is not limited to items listed above.

Each of the browsing users can have their own preferred list that allows the serving system 12 to obtain the user preference through a specific algorithm. Therefore, the serving system can rely on the preferred list to prioritize the related contents to be played and to set up the points of interest in the display area.

The framework shown in FIG. 1 can be operated in the social media that provides and shares various contents.

However, since the service of notifying the users of contents within various regions of interest is not available in the conventional technology due to the limitation of a conventional algorithm, the conventional social media can only recommend the contents within a narrow range. As a result, most of the contents are similar. Further, the recommended contents may be too broad and unfocused, or may be uninteresting to the users if the contents to be provided by the conventional social media are not based on the user preference under a specific circumstance.

The method for providing the contents within the region of interest of the user is provided as a solution to the above problems. In the method, the user preference is learned by collecting user activity data and can be used to derive the region of interest of the user through a specific algorithm. Accordingly, the system performing the method is able to recommend the contents that match the user preference within the region of interest and/or locally popular contents.

Figure 2:
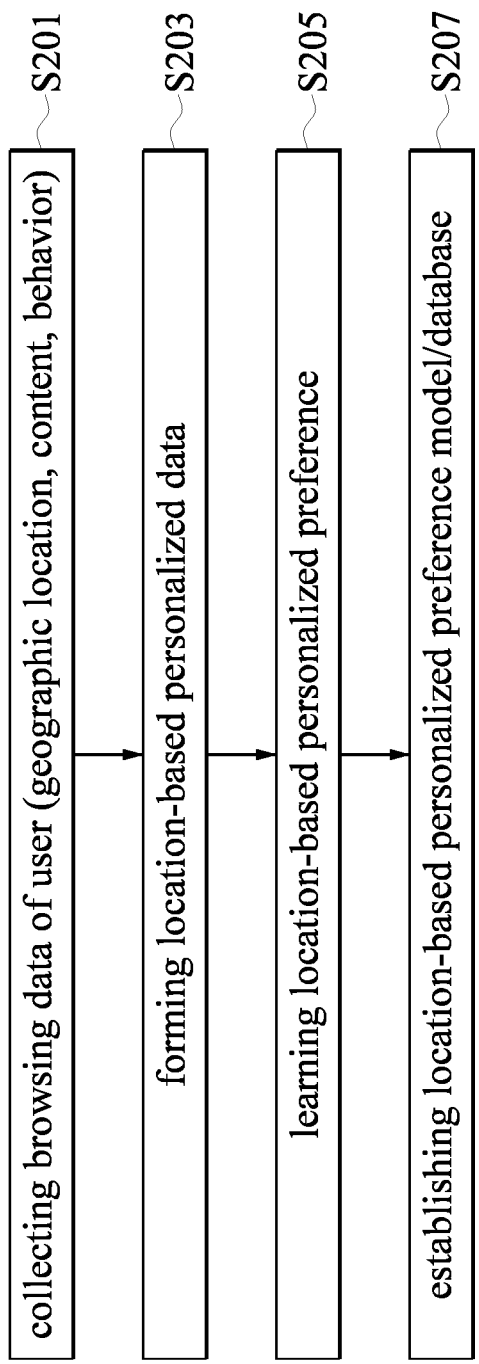
FIG. 2 is a flowchart illustrating a process of the system learning a user preference according to one embodiment of the present disclosure.

FIG. 2 is a flowchart illustrating a process for forming the user preference in the method performed by the system according to one embodiment of the present disclosure.

According to one of the embodiments, in step S201, the serving system gathers browsing data of the user through a browser program executed in a user-end computer device. The browsing data forms records of the location-based contents browsed by the user. The features of the data are correlated with the geographic location. In an exemplary example, the user manipulates a mobile device that executes the browser program. When the user arrives at a location, the user reports or produces a video, an audio, a picture, or a text within the geographic range by an application program (e.g., the browser program). The video, the audio, the picture, or the text is uploaded to the serving system after the user device is connected to the serving system. The content uploaded to the serving system includes metadata that at least records geographic information and user identification data relating to the content. It should be noted that the serving system can obtain the user identification data when the user logs on the system. In step S203, the serving system analyzes the uploaded content and the collected activity records of the user for forming the location-based personalized data that is stored in the database of the serving system.

Next, in step S205, the serving system can rely on the geographic information of various activity data to establish the location-based personalized data of the users. A machine-learning algorithm can be incorporated to learn data features from the geographic data and weights with respect to the data features. In step S207, a location-based personalized preference model that is used to define the user preference is formed for each of the users. The data features may also be combined to form a location-based user preference (which, in practice, can be a user preference profile). Thus, the software procedure running in the serving system can rely on the user preference profile to obtain one or more location-based personalized contents according to the user preference. It should be noted that different weights will be calculated and applied to the data features learned through the machine-learning algorithm according to levels of relevance of the data features. The data feature with higher relevance can be assigned with a higher weight, and the data feature with lower relevance can be assigned with a lower weight. Therefore, the user preference can be accurately described.

In one embodiment of the present disclosure, the activity data collected by the serving system through the user-end computer device includes the activities in various social media, search records, the followed contents, the browsed contents (and their hashtags), and time information of the activities. For example, browsing records collected by the serving system can be cookies, copies, and history records kept in a web browser. The activities in the social media are, for example, acts of check-ins, search records, likes, shares, follows, and replies. Such information may include records of geographic locations. The records may cover the data of the related geographies and the location-based media contents. Further, when determining a level of the user preference, the serving system can take the time spent on browsing the content and its cycle, a frequency and a length of time spent on browsing relevant contents, whether or not the user shares the content with other users, and whether or not the content is created by the user into consideration. The serving system relies on these data to establish the location-based personalized preference model and the database. Accordingly, the serving system can perform a sorting of preference whilst providing the location-based personalized content to the user.

According to one of the embodiments, the serving system provides the contents to be browsed on an electronic map through the application program executed in the user-end computer device when the user browses the contents on the electronic map. Each of the contents is associated with a specific geographic location. While the user browses the contents, the serving system simultaneously obtains the browsing records of the user (such as videos, audios, pictures, and/or texts). Records generated include the user identification data, the geographic location or a geographic range (latitude and longitude), browsing contents, and activities (such as likes, bookmarks, shares, etc.). The records may also include tags and times assigned to the contents. The records can be references learned by a learning algorithm for formation of the user preference.

In one further embodiment of the present disclosure, the application program provided by the serving system serves as a user interface provided for the user to browse the contents. The application program can be a web browser provided for the user to browse various contents. The browsed content and the browsing records of the user may be marked with the geographic information, and are also used by the learning algorithm to learn a location-based preference of the user.

The user reference that is learned from the various activity data and the browsing records of the user becomes one of the references for the serving system to provide the contents to the user. According to one embodiment of the method for providing the contents within the region of interest of the user, the contents include the regions of interest of the user that are obtained by the system based on the activity data of the user. If there are contents shared by other users within the region of interest of the user, the system allows the user to effectively browse the contents that are within the regions of the interest and match the user preference (and/or the popular contents) after a learning process through an algorithm. The serving system achieves improvement of a user experience when the contents provided by the system match the regions of interest of the user, the user preference, high popularity, high recency and high freshness.

Figure 3:
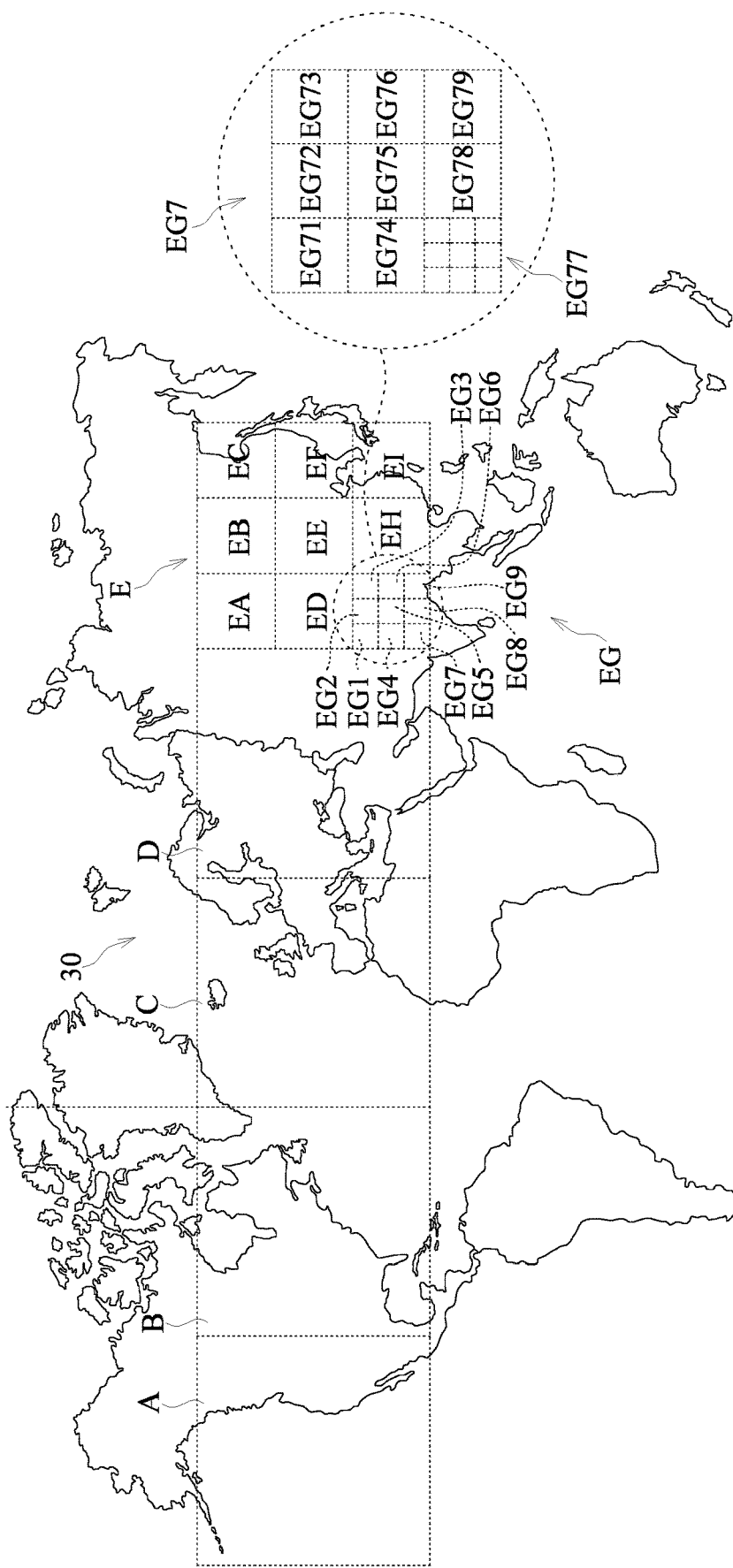
FIG. 3 is a schematic diagram showing regions of interest of the user being learned in the method for providing the contents within the region of interest of the user according to one embodiment of the present disclosure.

FIG. 3 is a schematic diagram showing an exemplary example of learning the regions of interest of the user in the method for providing the contents within the region of interest of the user. In order to accurately calculate the regions of interest of the user and not overly limit a range of the regions of interest, the algorithm adopted in the method incorporates a multi-layer regional scoring framework having multiple layers (e.g., N layers, in which N is an integer), and an upper region is configured to be divided into multiple lower regions. For example, a global region can be divided into multiple small regions layer by layer, and the system can collect records of activities of every user in each of the small regions.

In an exemplary example, the global region indicates a worldwide area or a region having a large range. For example, the global region can be the Americas, Europe, Asia, or any country. Reference is made to FIG. 3, which is a schematic diagram showing a global map 30 that is divided into five top layers (i.e., first-layer regions A, B, C, D and E).

Then, each of the first-layer regions A, B, C, D and E is divided into multiple second-layer regions. For example, the first-layer region E is divided into nine lower regions that are exemplarily second-layer regions EA, EB, EC, ED, EE, EF, EG, EH and EI. Afterwards, each of the second-layer regions EA, EB, EC, ED, EE, EF, EG, EH and EI is further divided into nine lower regions. In an exemplary example, the second-layer region EG is divided into nine smaller third-layer regions EG1, EG2, EG3, EG4, EG5, EG6, EG7, EG8 and EG9. In a similar fashion, the third-layer region EG7 can be divided into multiple fourth-layer regions EG71, EG72, EG73, EG74, EG75, EG76, EG77, EG78 and EG79.

It should be noted that the upper region can be divided into multiple lower regions in an even manner or based on a practical requirement. The quantity of the multi-layer regions is not necessarily limited to a specific number, but the number of the layers can be decided according to a practical requirement. For example, when the system is required to determine the region of interest of the user more accurately, more layers of regions can be used. On the contrary, if the system does not need exact regions of interest of the user or only requires larger regions of interest, fewer layers of regions can be used.

Figure 4:
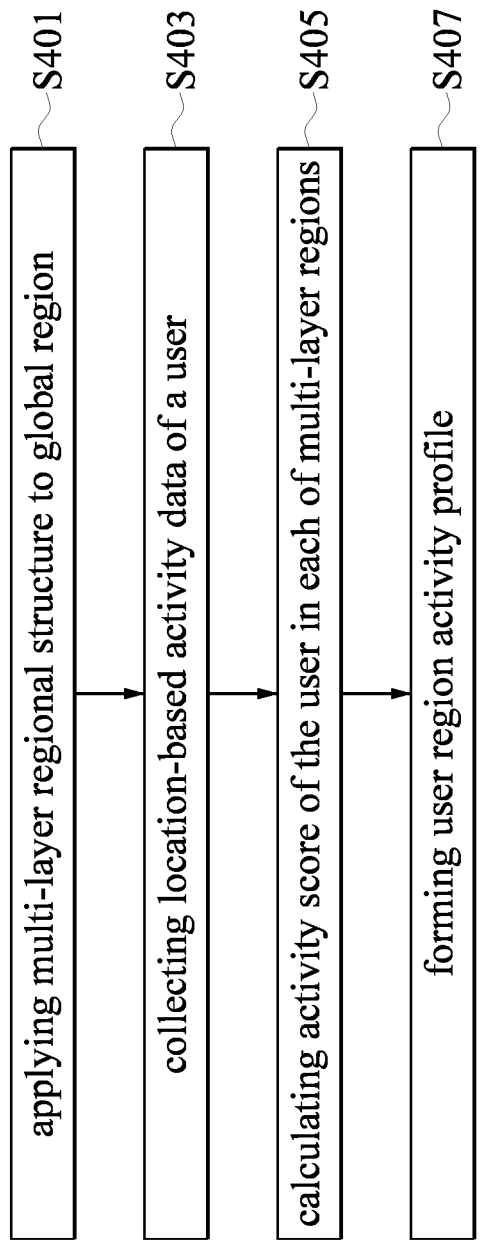
FIG. 4 is a flowchart illustrating a process of computing a user activity score in the method for providing the contents within the region of interest of the user according to one embodiment of the present disclosure.

According to one further embodiment of the method for providing the contents within the region of interest of the user, the above multi-layer regional structure can be incorporated for providing the regions of interest of the user. In the method, the activity score of the user in each of the above regions can be calculated and used to establish a user regional activity profile. The system can rely on the user regional activity profile to provide the regions of interest of the user and the contents therein. FIG. 4 is a flowchart illustrating a process of computing a user activity score in the method for providing the contents within the region of interest of the user according to one embodiment of the present disclosure.

The global map 30 shown in FIG. 3 is firstly provided. The multi-layer regional structure is applied to the global region, and the first-layer regions, the second-layer regions, the third-layer regions and the fourth-layer regions are provided (step S401). In an exemplary example, the global map 30 having N-layer regions is provided. N in FIG. 3 is 4, but can be any integer. Thus, the global map can be divided into multiple sub-regions layer by layer. The global map is firstly divided into multiple first-layer regions, each of the first-layer regions is divided into multiple second-layer regions, and so on. The division ends until the global map is divided into the N-layer regions.

When the user uses the service provided by the serving system through the application program, the system receives location information of different locations generated as the user manipulates the user device, and the system continuously collects the location-based activity data of the user (step S403). When the user performs a valid activity at a different location, the system records the location information of the location, the N-layer region of the location, and the multi-layer regions associated with the first-layer region. The system then assigns scores to the multiple layers of regions associated with the location, and calculates an activity score of the user in each of the multi-layer regions (step S405). The scores assigned to the multiple layers of regions associated with different locations of the user are accumulated, so as to establish the user regional activity profile (step S407). In this way, the system can obtain one or more regions of interest of the user.

It should be noted that, if the serving system determines that the multi-layer regions that the user is interested in are adjacent regions through the algorithm, these adjacent regions can be merged according to requirements displayed on the user device in one embodiment. The merged regions can be shown to the user at one time via the user interface, instead of having similar regions of interest provided to the user in multiple times.

In particular, in order to effectively calculate the regions of interest of the user, the system may limit valid activities of the user at certain locations to ignore casual browsing behaviors. The valid activities are the behaviors of the user in the social media that will be taken into consideration in a score calculation. The behaviors classified as the valid activities can be a behavior of clicking to view a location-based content, adding a like to the location-based content, sharing the location-based content, actively searching a location through the application program, and clicking on a link of a location whilst viewing the location-based content. However, in practice, the valid activities are not limited to the above-mentioned behaviors.

Reference is made to the example shown in FIG. 3 and the process of calculating the user activity score shown in FIG. 4. When the system determines that the user performs one of the above-mentioned valid activities in the fourth-layer region EG72, in the user profile, the score assigned to the fourth-layer region EG72 is increased by 1, and the score assigned to each of its upper regions is also increased by 1 (i.e., adding 1 to the score assigned to the third-layer region EG7, adding 1 to the score assigned to the second-layer region EG, and adding 1 to the score assigned to the first-layer region E). Afterwards, within a valid time (e.g., two weeks) set by the system, if the user performs another one of the valid activities that can be assigned with the score in the fourth-layer region, the scores in other related layers can be increased by 1 in a layer-by-layer manner. Thus, based on the score accumulated in each of the regions, the system allocates weights to score calculation in each of the regions according to the user preference learned by the system. The system can obtain the regions of interest of the user within the valid time, and accordingly determines one or more regions of interest of the user, so as to provide location-based contents that match the user preference. Further, the scores assigned to the regions at different layers can be accumulated and sorted. In this way, the system can provide the location-based and personalized contents according to an order of the regions of interest of the user.

Figure 5:
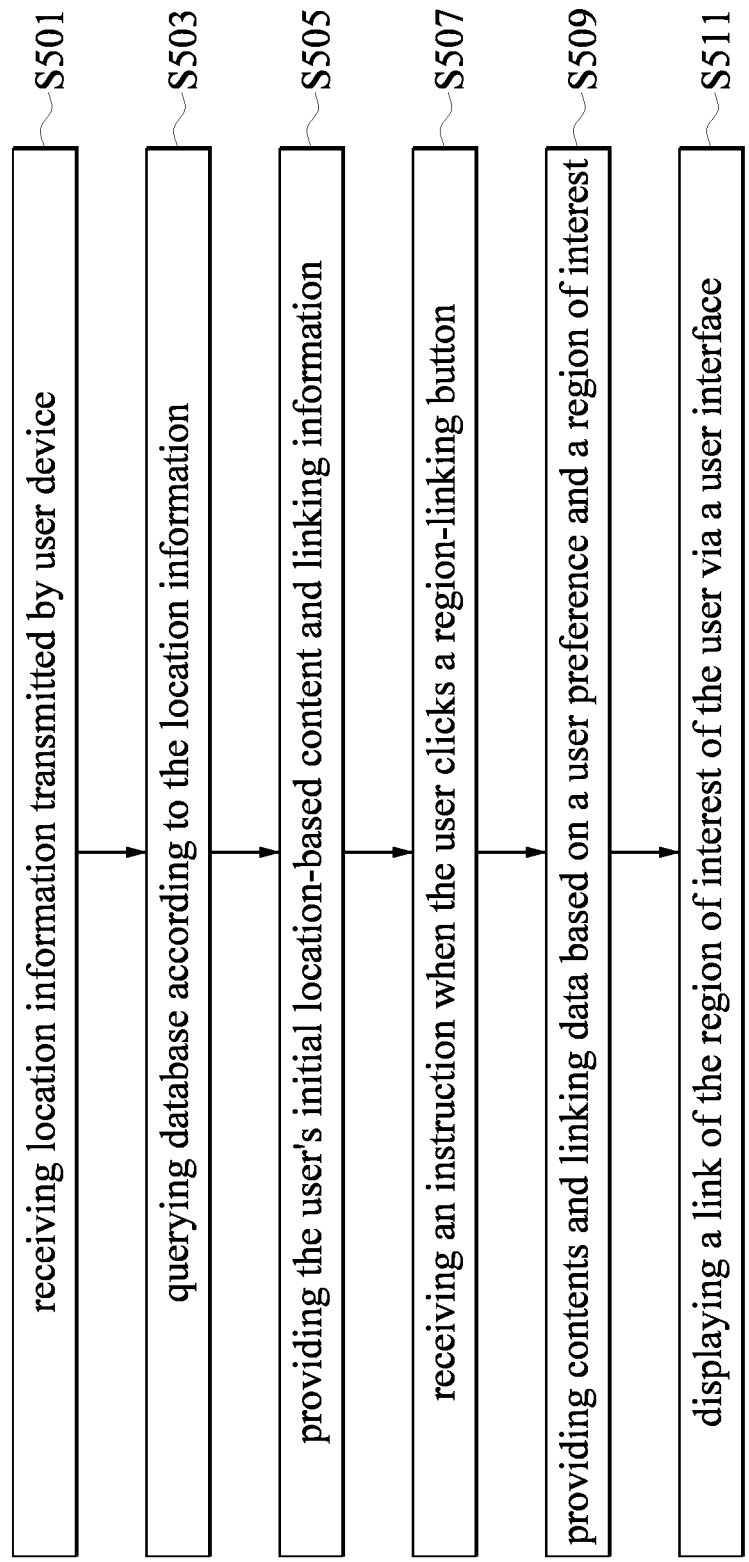
FIG. 5 is a flowchart illustrating the method for providing the contents within the region of interest of the user according to one embodiment of the present disclosure.

According to the user preference profile obtained in FIG. 2 and the user regional activity profile obtained in FIG. 4, the system can not only provide the location-based contents that match the user preference, but also provides the content within the regions of interest of the user. Reference is further made to FIG. 5, which is a flowchart illustrating the method for providing the contents within the region of interest of the user according to one embodiment of the present disclosure. In the meantime, reference can be made to FIG. 6A to FIG. 6D, which are schematic diagrams showing exemplary examples of links of the regions of interest of the user on an electronic map according to one embodiment of the present disclosure.

In the beginning of the process, a user interface is initiated by an application program executed in a user device. In certain embodiments, the user interface initiated by the application program can use an electronic map as a background. Multiple content-linking icons associated with multiple locations are marked on the electronic map. The linking icon can be an icon of an author who creates the linked content or a content thumbnail (the content can be a video or an image). Content links can also be shown as a list. In one aspect, texts are used to represent the links of the contents (e.g., URL). The user can click on such a text link to play the linked content (e.g., playing the video or the image).

In the flowchart of the present embodiment, the user device installs and executes the application program corresponding to the service for providing the contents in the serving system. The application program can be an application proprietary to a social media that provides the digital contents to be shared by users. The serving system receives location information generated by the user device through the application program (step S501). For example, the location information can be a location detected by a positioning circuit of the user device or a location generated by the application program when the user manipulates the application program to browse a specific geographic region. The serving system then queries a database according to the location information (step S503). The serving system can provide the location-based contents and the content-linking information in an initial image according to a range correlated with the location information (step S505). In particular, the serving system can acquire the user preference profile according to user identification (e.g., a user ID) transmitted by the application program manipulated by the user. The serving system relies on the user preference profile to retrieve one or more contents that correlates with one of the regions of interest of the user and matches the user preference.

Figure 6B:
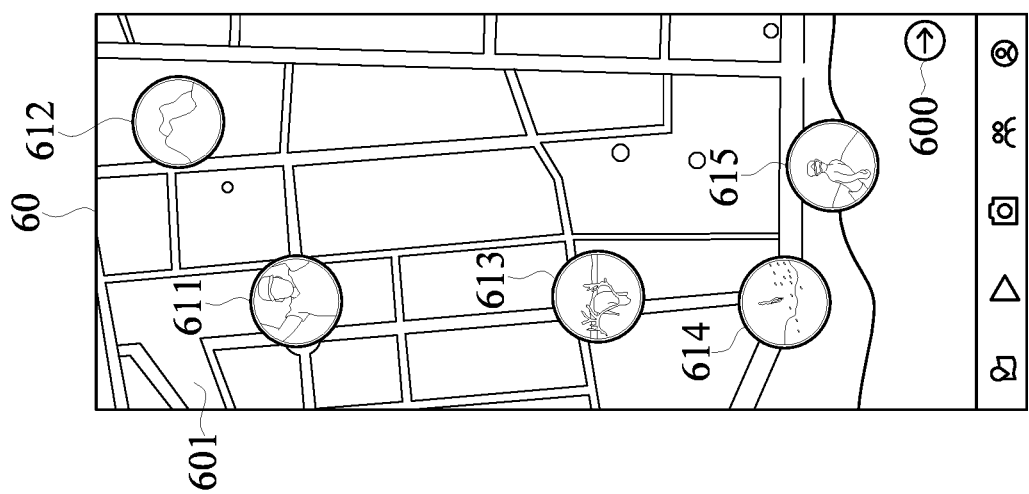
FIG. 6A to FIG. 6D are schematic diagrams showing exemplary examples of links of the regions of interest of the user on an electronic map according to one embodiment of the present disclosure.
Figure 6A:
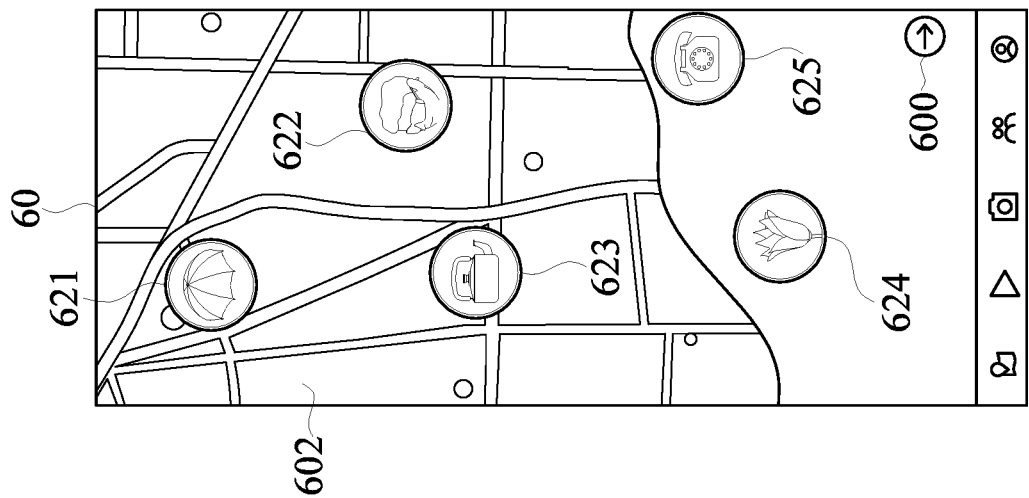

With respect to the initial image, reference can be made to FIG. 6A. The user manipulates an application programming interface 60 to initiate a first user interface 601 for browsing contents within a specific region. If the contents are initially provided through the application program within the specific region, the initial user interface shows the personalized and location-based contents corresponding to a current location of the user. If the contents are provided by the serving system after the user manipulates the user device for a period of time, the contents are based on the location and the region of interest of the user.

In the example shown in FIG. 6A, the first user interface 601 uses an electronic map as a background, and several content-linking icons 611, 612, 613, 614 and 615 are marked at different locations of the electronic map. In the present example, the circular content-linking icon (611, 612, 613, 614 or 615) can be an image of an author of the content or a thumbnail extracted from the content. Each of the content-linking icons 611, 612, 613, 614 and 615 is linked to a playable location-based content, such as a video, a picture, an audio or a text. It should be noted that there is a link with an arrow inside a circle positioned at a lower right corner of the first user interface 601. This circular icon serves as a region-linking button 600 provided in the application programming interface 60. The region-linking button 600 is provided for the user to click and jump to an interface that is linked to a next region of interest of the user.

After that, the serving system receives an instruction, and the instruction is generated by clicking on one of the links within the region of interest of the user on the user interface that is initiated by the application program executed in the user device. For example, the user can click on the region-linking button 600 shown in FIG. 6A, and the instruction is generated (step S507). The instruction includes location information that concerns a region of interest of the user obtained from the user regional activity profile retrieved from the database according to a user identification. A second user interface 602 of FIG. 6B is then provided. The serving system can retrieve a user preference profile from the database according to the user identification, and provide contents and linking data based on the user preference and the region of interest in the user preference profile (step S509). The content links are displayed within the region of interest of the user via the user interface of the user device (step S511).

Figure 6C:
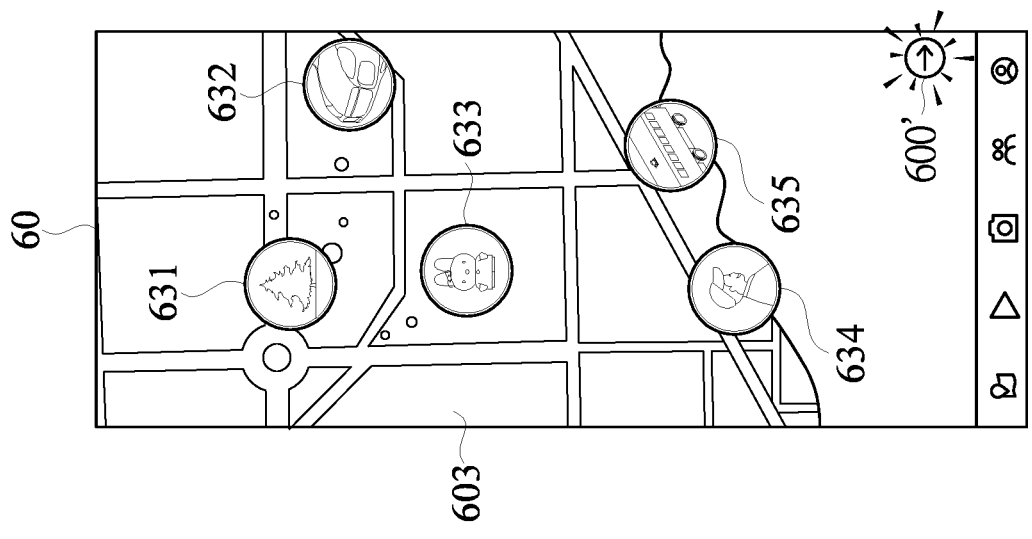
Figure 6D:
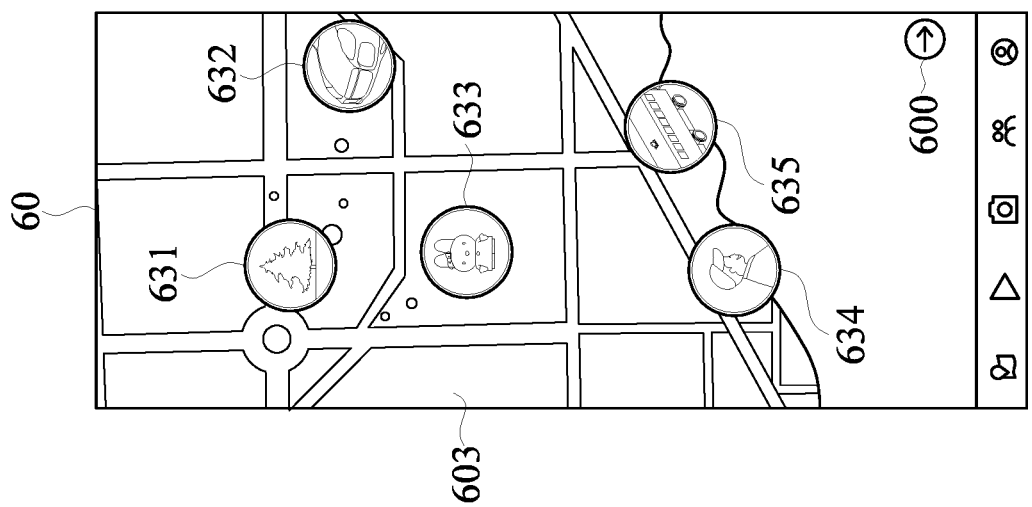

According to an example shown in FIG. 6B, the second user interface 602 using an electronic map as a background is provided. There are many content-linking icons 621, 622, 623, 624 and 625 marked on the electronic map. The second user interface 602 can be provided when the user clicks on the region-linking button 600 on the first user interface 601. In the meantime, after querying the database, the location-based contents in accordance with the region of interest of the user are obtained. The location-based contents can also be consistent with the user preference. Similarly, the second user interface 602 provides the region-linking button 600 that allows the user to acquire more contents within another region of interest. FIG. 6C shows a third user interface 603 that displays multiple content-linking icons 631, 632, 633, 634 and 635 associated with the contents that are within the region of interest of the user and consistent with the user preference. The region-linking button 600 is still provided for the user to browse a next location-based content within the region of interest of the user.

Thus, the user can go on using the links of the regions of interest via the user interface to obtain more contents that match the regions of interest of the user. The location-based contents that match the user preference are provided according to an order of the regions of interest of the user. Further, when the system provides the contents within the region of interest of the user, the contents can be sorted according to a specific condition (e.g., popularity), and the serving system can rely on this sorting result to provide the contents to the user in a selective manner. Furthermore, some further conditions can also be incorporated for filtering out the contents to be provided to the user. The conditions include being new/recent, popular, unseen, or any combination thereof, so that the user is able to view the contents that match the user preference and/or popularity in every region of interest.

However, when the serving system can no longer provide any content within the region of interest of the user (since only a certain limited amount of contents within the region of interest are provided in the serving system or only a certain amount of the regions of interest can be learned by the serving system according to the activity data of the user), the user can still obtain the various contents provided by the serving system until reaching an upper limit of a number of pages provided by the system. Lastly, the application program will return to the initial page, and the contents that are not viewed by the user can be provided on the initial page. For example, the system initially provides relatively new location-based contents uploaded by other users or newly-uploaded location-based contents that are not viewed by the user (i.e., the location-based contents that meet one or any combination of the above-mentioned new/recent, popular, and unseen conditions.

Conventionally, when the user manipulates the application programming interface 60 to browse a specific region by way of swiping, a swiping gesture, a zooming-in gesture or a zooming-out gesture needs to be performed multiple times. This does not allow the user to smoothly browse different regions. In contrast, the method provided by the present disclosure allows the user to quickly and easily browse the regions of interest. The user can not only quickly view the regions of interest via the region-linking button 600, but can also view the region without any link of content when the map is viewed by way of swiping. In certain embodiments, the application programming interface 60 further initiates a prompting message (which can be a changed image, a text reminder, a vibration, a sound or the like) for prompting the user to jump to another region of interest via a specific link with respect to a region of interest of the user. For example, in FIG. 6D, the application programming interface 60 adopts a blinking region-linking button 600' to prompt the user to click on the link for jumping to a next region of interest of the user. According to the present embodiment of the present disclosure, if the serving system determines that the region includes no link of content on the user interface through the application program, the serving system will activate the region-linking button 600' to blink, change colors or other prompting message through the application program, so as to remind the user to click on the button 600' for jumping to another region of interest of the user.

Based on the above-described method and system for providing the contents within the region of interest of the user, in addition to providing the contents within the region of interest of the user through the application program executed in the user device, a discussion topic that is initiated by a user relating to the region of interest can also be provided. That is, the system allows the user to initiate the location-based discussion topic when the user is browsing the contents within a specific region, and the discussion topic is provided for interaction with other users who are also browsing the contents within the same region or with people who are geographically related to this region. FIG. 7A to FIG. 7D schematically show the user interface in one embodiment of the present disclosure.

FIG. 7A to FIG. 7D are schematic diagrams showing a discussion topic being initiated in the method for providing the contents within the region of interest of the user according to one embodiment of the present disclosure. The application program executed in the user device initiates a user interface, and the user interface can be a graphical user interface that uses an electronic map as a background. However, the user interface is not limited thereto. For example, a list can be used to display various location-based discussion topics.

Figure 7B:
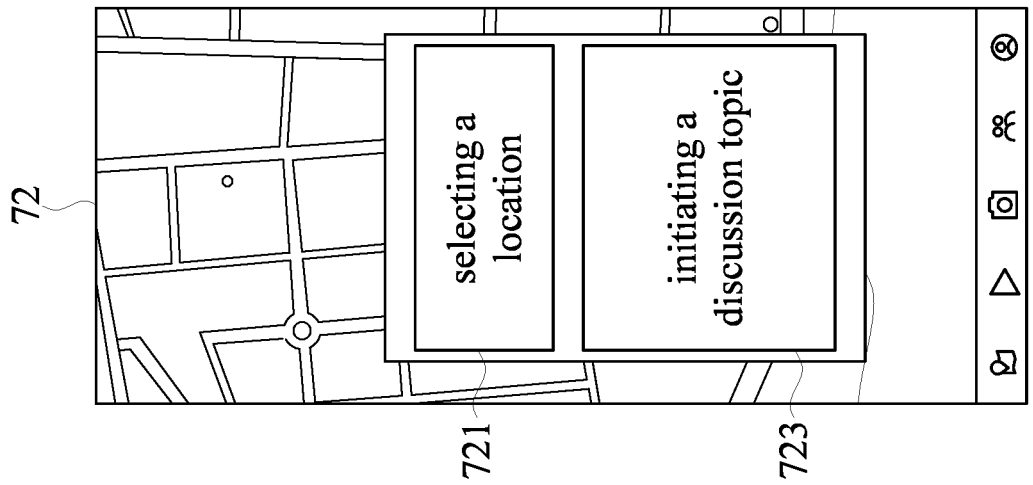
Figure 7A:
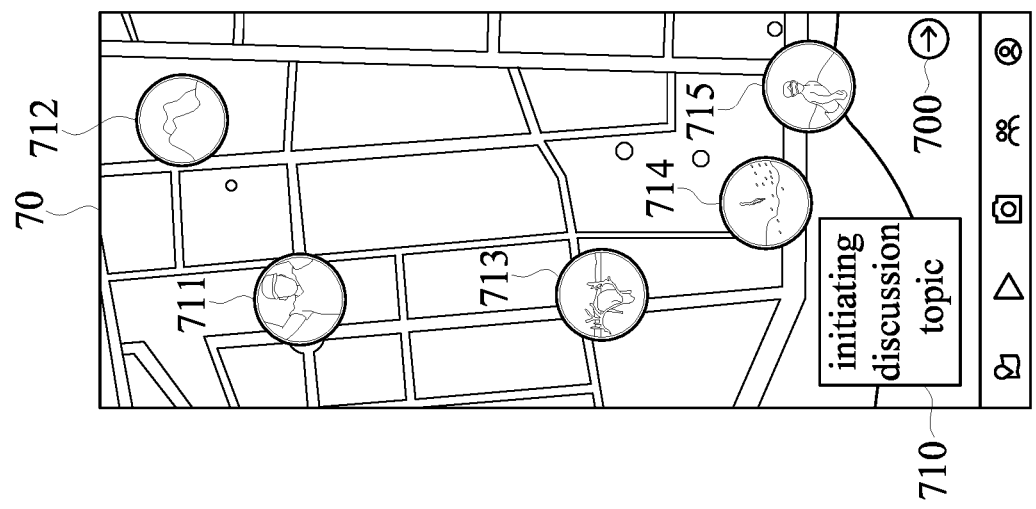

When the user manipulates the application program executed in the user device, the application program connects with the serving system and initiates a user interface 70 as shown in FIG. 7A. The user interface 70 is a graphical user interface that incorporates an electronic map as a background. When the application program connects with the serving system, the location information generated by the user device is transmitted to the serving system. The location information can be generated by a positioning circuit of the user device, or can be generated when the user manipulates the application program to browse a specific geographic range. In one embodiment of the present disclosure, the serving system can obtain the user identification and display information of the user device through the application program. The serving system can accordingly provide personalized and location-based contents that match the display capability of the user device.

In the meantime, the serving system relies on the location information to query the database and make a comparison with a display range initiated by the application program of the user device for obtaining one or more location-based digital contents, location-based topics or a prompting message used to prompt the user to initiate a location-based topic within the display range. These location-based contents are transmitted to the user device, and one or more content-linking icons corresponding to one or more contents are marked on the user interface initiated by the application program. The linking icon can be a thumbnail extracted from the digital content or a picture of an author of the digital content. For example, in FIG. 7A, multiple location-based content linking icons 711, 712, 713, 714 and 715 are marked on the user interface. A computer-implemented region-linking button 700 is also displayed on a specific position within the display area. A picture, a text or an animation reminder on a specific position can be used to prompt the user to initiate a location-based topic. A prompting message 710 of "initiating a discussion topic" is displayed on the display area in the present embodiment.

When the user clicks on the prompting message 710, the application program opens a discussion topic page 72 shown in FIG. 7B, and fields such as "selecting a location" 721 and "initiating a discussion topic" 723 are provided to the user for inputting geographic information and the discussion topic. The location-based discussion topic can therefore be initiated. FIG. 7C is a schematic diagram showing the discussion topic being initiated (i.e., a topic-linking icon 730) on the user interface.

It should be noted that the discussion topic page includes a field for inputting the geographic information and a field for inputting the discussion topic. For example, the field for inputting the geographic information can have the location information of the prompting message automatically filled in or allow the user to input the geographic information where the discussion topic is located. The content of the topic can be a question, an opinion or any message that the user submits. In the serving system, a specific algorithm is used to analyze the content of the topic and classify the topic, and the result thereof can be used for matching the user preference.

Afterwards, when the user browses a geographic range that includes the location-based topics through the application program, the serving system pushes one or more location-based topic-linking icons within the geographic range to the application program executed in the user device. Similarly, the topic-linking icon 730 is shown on a corresponding location of the electronic map, and can be provided for the user to click on for entering the discussion topic page.

According one of the embodiments of the present disclosure, when the location-based topic is established, the user interface embodies a location-based topic list page 74 that displays one or more location-based topics 741 in a list form (as shown in FIG. 7D). The links with respect to the location-based topics can be represented by icons or texts that are provided for the user to click on and enter a linking discussion topic page.

In conclusion, the conventional social media does not learn the region of interest of the user, so that the contents recommended to the users will be associated with an overly broad region and do not match the regions of interest of the user. In the method and the system provided by the present disclosure, apart from allowing the user to browse the contents that match the user preference through a regular content provider, the contents that match the user preference and the regions of interest of the user can also be learned and provided by the system through a learning process. One of the approaches in the method is to guide the user to browse the contents that match their regions of interest through an electronic map. The contents provided by the system are deduced based on conditions that include the regions of interest of the user, the user preference, and popularity and recency of the contents. The contents are provided to the user after a sorting process, so as to achieve the purpose of improving the user experience.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A method for providing contents within a region of interest of a user, which is operated in a serving system, the method comprising:
   providing a link of a region of interest of the user via a user interface displayed on a user device;
   receiving an instruction in the serving system via the link of the region of interest, and querying a database of the serving system according to one or more regions of interest of the user in a user regional activity profile, so as to acquire one of the regions of interest correlated with the user; and
   displaying the region of interest of the user on the user interface of the user device;
   wherein the user regional activity profile is formed by steps of:
      providing a global map configured to have N layers of regions, wherein N is a positive integer; wherein the global map is divided into multiple first-layer regions, and each of the first-layer regions is further divided into multiple second-layer regions; wherein the global map is divided into multi-layer regions until reaching an N-layer region,
      receiving location information of a location generated as the user manipulates the user device;
      recording, when the serving system receives location information generated by a user device manipulated by a user at a location and the user performs a valid activity at the location, the location information of the location, the N-layer region of the location, and the multi-layer regions associated with the first-layer region in the serving system; and
      assigning a score to each of the multi-layer regions associated with the location;
      wherein, after the scores of the multi-layer regions respectively associated with multiple locations of the user are accumulated, the user regional activity profile is formed, so as to obtain the one or more regions of interest of the user.

2. The method according to claim 1, wherein the user interface is initiated by an application program executed in the user device, and the user interface provided by the application program uses an electronic map as a background for displaying the region of interest of the user.

3. The method according to claim 2, wherein the serving system provides one or more links associated with one or more contents within the region of interest of the user, and the one or more links are one or more linking icons displayed on the electronic map; wherein the linking icon is an author icon of a creator of the linked content or a content thumbnail.

4. The method according to claim 3, wherein the serving system acquires the user regional activity profile and a user preference profile according to a user identification, so as to acquire the one or more contents that correlate with one of the regions of interest of the user and match a user preference.

5. The method according to claim 3, wherein the one or more contents within the region of interest provided by the serving system include a discussion topic, and the discussion topic is a location-based topic to be initiated at a location for interacting with other users.

6. The method according to claim 4, wherein the user preference profile is formed by steps of:
   collecting activity data of the user through the application program executed in the user device;
   analyzing activity records of the user, wherein a machine-learning algorithm is used to learn data features that are location-based from the activity data and correlations among the data features; and
   obtaining a location-based personalized model that is used to describe the user preference or forming location-based data that is a combination of features of the user preference, so as to form the user preference profile.

7. The method according to claim 2, wherein, when the serving system determines that a region without any linking content is shown on the user interface through the application program, the serving system generates a prompting message through the application program for prompting the user to switch to another region of interest via the link of the region of interest of the user.

8. The method according to claim 1, wherein the valid activity indicates a behavior of the user in a social media that is taken into score calculation; wherein the behavior of the user includes clicking on and viewing a location-based content, adding a like to the location-based content, sharing the location-based content, actively searching for the location through the application program, and clicking on one of links associated with the location when viewing the location-based content.

9. The method according to claim 1, wherein, after the scores of the multi-layer regions respectively associated with the multiple locations of the user within a valid time period are accumulated, the scores accumulated in the regions of different layers are sorted, so that the location-based contents that match the user preference are provided according to an order of the regions of interest of the user.

10. A system for providing contents within a region of interest of a user, comprising:
   a serving system having a database, wherein the database records multiple location-based contents and multiple pieces of user data; and
   an application program executed in a user device, wherein the application program initiates a user interface for allowing the user to browse one or more contents within the region of interest;

wherein the serving system performs a method for providing the contents within the region of interest of the user, and the method includes:
- providing a link of a region of interest of the user via the user interface displayed on the user device;
- receiving an instruction in the serving system via the link of the region of interest, and querying the database according to one or more regions of interest of the user in a user regional activity profile, so as to acquire one of the regions of interest correlated with the user; and
- displaying the region of interest of the user on the user interface of the user device;

wherein the user regional activity profile is formed by steps of:
- providing a global map configured to have N layers of regions, wherein N is a positive integer; wherein the global map is divided into multiple first-layer regions, and each of the first-layer regions is further divided into multiple second-layer regions: wherein the global map is divided into multi-layer regions until reaching an N-layer region;
- receiving location information of a location generated as the user manipulates the user device;
- recording, when the serving system receives location information generated by a user device manipulated by a user at a location and the user performs a valid activity at the location, the location information of the location, the N-layer region of the location, and the multi-layer regions associated with the first-layer region in the serving system; and
- assigning a score to each of the multi-layer regions associated with the location;
  - wherein, after the scores of the multi-layer regions respectively associated with multiple locations of the user are accumulated, the user regional activity profile is formed, so as to obtain the one or more regions of interest of the user.

11. The system according to claim 10, wherein the user interface provided by the application program uses an electronic map as a background for displaying the region of interest of the user.

12. The system according to claim 11, wherein the serving system provides one or more links associated with the one or more contents within the region of interest of the user, and the one or more links are one or more linking icons displayed on the electronic map; wherein the linking icon is an author icon of a creator of the linked content or a content thumbnail.

13. The system according to claim 12, wherein the serving system acquires the user regional activity profile and a user preference profile according to a user identification, so as to acquire the one or more contents that correlate with one of the regions of interest of the user and match a user preference.

14. The system according to claim 12, wherein the one or more contents within the region of interest provided by the serving system include a discussion topic, and the discussion topic is a location-based topic to be initiated at a location for interacting with other users.

15. The system according to claim 11, wherein, when the serving system determines that a region without any linking content is shown on the user interface through the application program, the serving system generates a prompting message through the application program for prompting the user to switch to another region of interest via the link of the region of interest of the user.

* * * * *